April 5, 1927. 1,623,311
W. HODECKER
METHOD OF MANUFACTURING DOUBLE WALLED GLASS VESSELS
Filed May 4, 1926 2 Sheets-Sheet 1
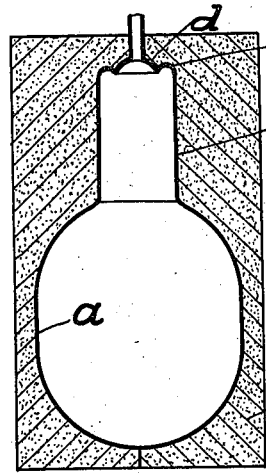
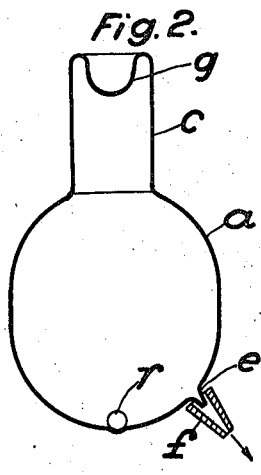
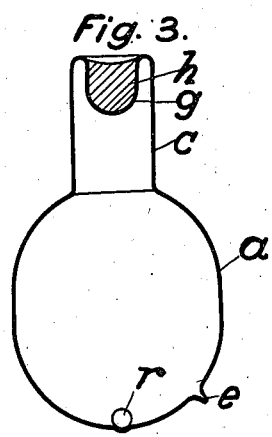
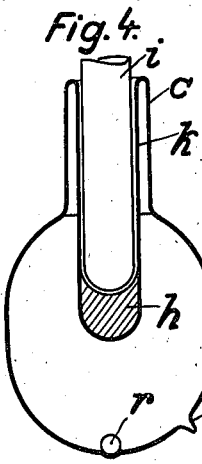
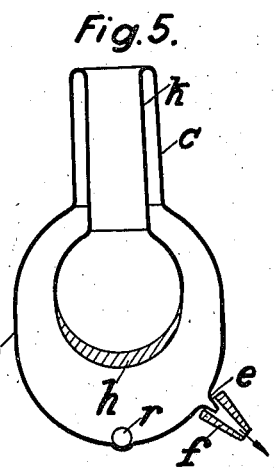
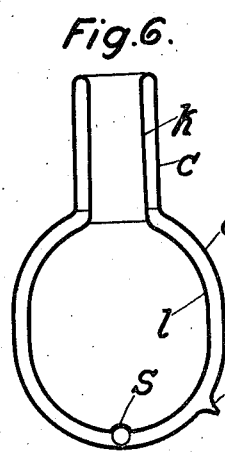
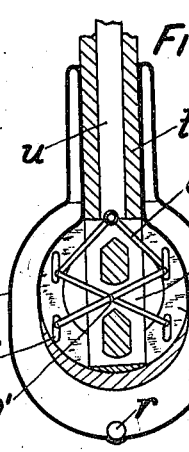
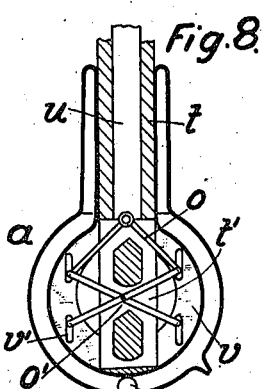
Inventor:
Wilhelm Hodecker
by Locke, Kehlenbeck & Farley
Attorneys April 5, 1927. 1,623,311
W. HODECKER
METHOD OF MANUFACTURING DOUBLE WALLED GLASS VESSELS
Filed May 4, 1926 2 Sheets-Sheet 2
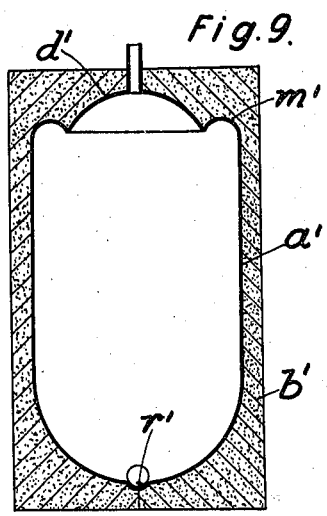
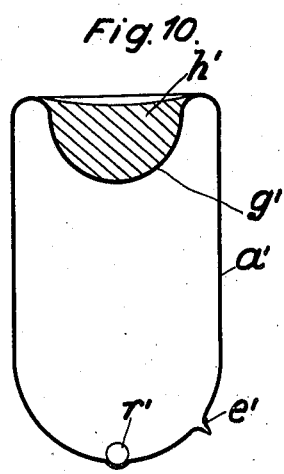
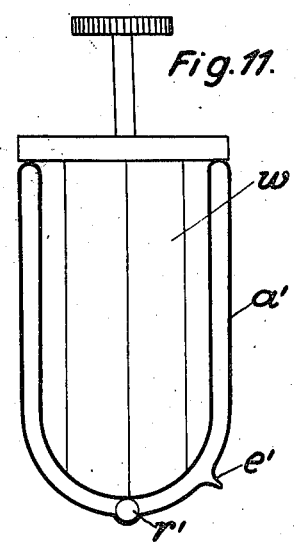
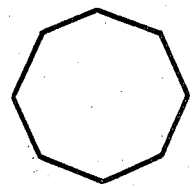
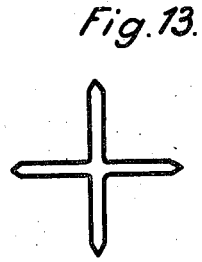
Inventor:
Wilhelm Hodecker
by Loxa, Kehlenbeck & Farley
Attorneys Patented Apr. 5, 1927.

1,623,311

UNITED STATES PATENT OFFICE.

WILHELM HODECKER, OF ILMENAU, GERMANY.

METHOD OF MANUFACTURING DOUBLE-WALLED GLASS VESSELS.

Application filed May 4, 1926, Serial No. 106,631, and in Germany December 12, 1924.

My invention relates to improvements in the method of manufacturing double-walled glass vessels, and the object of the improvements is to provide a method which is economical in operation, and which permits the manufacture of the vessels near the glass furnace. With this object in view my invention consists in first blowing the outer wall of the vessel and providing the same at its top with a cap, thereafter causing the said cap to sink into the vessel in the form of a cup, filling so much glass into the said cup, as is needed for forming the inner wall, and finally forming the cup and the glass filled into the same into the inner wall of the vessel.

In forming the inner wall of the vessel by expansion of the cup and mass of glass sunk into the same I make use of differential fluid pressure for example by evacuating the space included between the said cup and the outer wall, or of a mandrel adapted to form the said cup and mass of glass into the complete inner wall, and in some cases, and more particularly where the vessel to be manufactured has a comparatively large diameter as compared to the neck, I partly expand the cup by means of an expansible mandrel and I complete the forming of the inner wall by differential fluid pressure.

Another object of the improvements is to provide a method by means of which a spacing member is fixed in position between the inner and outer walls of the vessel. I have found that when merely placing a spacing member between the said walls while manufacturing the vessel the said walls recede from the said member when cooling the vessel by contraction of the inner wall. Therefore, I first manufacture the outer wall, place the said spacing member into the same, form the inner wall, and I reheat the outer wall and cause the same to be deformed so far that the contact between the spacing member and the inner and outer walls is insured. In the preferred form the said spacing member is placed between the bottoms of the inner and outer walls, while the side walls are not supported upon each other. I have found this method of supporting the bottoms on each other to be preferable for the reason that thereby the inner vessel is supported statically in a better way.

Other objects of the improvements will be understood from the following description of the method.

For the purpose of explaining the invention the successive steps of the manufacture of the vessel have been illustrated in the accompanying drawings, in which—

Fig. 1 is a sectional elevation showing the manufacture of the outer wall of the vessel and the cap thereof, Fig. 2 is a sectional elevation showing the vessel removed from the mould and having the cap sunk into its top part to form a cup, Fig. 3 is a similar sectional elevation showing the vessel having a mass of molten glass filled into the said cup, Fig. 4 is a similar sectional elevation showing the vessel with the cup and glass contained therein pressed into the body thereof, Fig. 5 is a similar elevation showing the cup and molten glass partly expanded within the body of the vessel, Fig. 6 is a similar sectional elevation showing the vessel complete, Fig. 7 is a similar sectional elevation showing a modification in which the cup and mass of glass is partly expanded by means of an expansible mandrel, Fig. 8 is a similar sectional elevation showing another modification, Fig. 9 is a sectional elevation similar to the one shown in Fig. 1 and illustrating my improved method as used for making a substantially cylindrical vessel, Figs. 10 and 11 are similar elevations showing two of the steps following the first step illustrated in Fig. 9, and Figs. 12 and 13, are diagrammatical plan views showing two forms of mandrels used in the step illustrated in Fig. 11.

In the example illustrated in Figs. 1 to 8, the first step of my improved method consists in manufacturing the outer wall $a$ of the vessel. In the example illustrated in Fig. 1 the said outer wall is blown in a mould $b$, and the vessel is provided with a neck $c$ and a cap $d$. The mould $b$ is formed at its top with an annular cavity forming the upper rim $m$ of the neck of the vessel. Now the blown body is taken out of the mould, and removed from the bunting iron, whereupon a spacing member preferably in the form of a small ball $r$ of a suitable material such as asbestos is brought into the vessel through the hole produced in the cap when removing the bunting iron. Now a hole $e$ is formed in the wall of the body $a$. Next, the cap $d$ is again heated and made soft, so that it sinks into the neck portion of the vessel, the said vessel being preferably partly evacuated through the hole $e$ by means of an evacuating apparatus indicated in Fig. 2 by a tubular member $f$. Thus a cup $g$ is formed within the neck portion $c$, as is shown in Fig. 2. This is possible on account of the rim $m$. The hole through which the spacing member $r$ is passed into the vessel closes itself when reheating the cap.

Into the cup so much liquid glass $h$ is poured as is necessary for forming the inner wall of the receptacle (Fig. 3), and the cup and molten glass contained therein are made to pass into the receptacle $a$. As shown in Fig. 4 a mandrel $i$ is used for this purpose, the said mandrel being passed through the neck $c$ into the body of the vessel thus forming the inner neck $k$. The mass of glass $h$ which has thus been brought into the body of the receptacle $a$ is still in a viscous state, and it is expanded within the body $a$. In the example illustrated in Fig. 5 such expansion of the glass is caused by further evacuating the glass vessel through the hole $e$ which for this purpose is again acted upon by the evacuating apparatus $f$. Thus the inner part of the vessel assumes the shape illustrated in Fig. 5. When further evacuating the vessel the inner body is finally brought into the form illustrated in Fig. 6, in which the inner wall has received the reference character 1.

As shown in Fig. 6 the spacing member $r$ is confined between the bottom of the outer wall $a$ of the vessel and a cavity $s$ formed in the bottom part of the inner wall. However, I have found that when taking the vessel from the furnace and allowing the same to cool the inner wall recedes from the ball by contraction, so that a small gap is produced between the ball and the cavity $s$ and the inner wall is not supported at its bottom on the outer wall. Therefore I reheat the outer wall to make the same soft, and I press the same by means of a suitable tool towards the bottom of the inner wall. Thereafter the outer wall is contracted by cooling, so that it presses itself on the ball thus insuring close contact between the ball and both walls.

As appears from Fig. 6, the inner receptacle 1 is supported on the outer receptacle $a$ exclusively at its upper rim and at its bottom. This is an important improvement for the reason that thereby the inner receptacle is supported statically in a favorable way.

In some cases, and more particularly when manufacturing such vessels in which the diameter of the body is much larger than the diameter of the neck, I prefer to use a rotary expansible mandrel, as is shown in a diagrammatical way in Fig. 7. In this case the mass of glass within the outer wall $d$ is first partly expanded by means of the mandrel, and thereafter the evacuating apparatus is used for imparting the final form to the vessel. As shown in Fig. 7, the mandrel $o$ is constructed so that it may be caused to spread outwardly after being inserted to the desired depth, thus expanding the mass of glass. While thus expanding the glass either the mandrel or the vessel is rotated about its axis. The mandrel may be of known construction. In the example shown in Figs. 7 and 8 it consists of a tubular member $t$ adapted to be passed into the vessel through the neck thereof and formed at its bottom end with a longitudinal slot $t^1$, a rod $u$ axially movable within said tubular member, links $o$ arranged within the slot $t^1$ and pivotally mounted on the member $t$ at $o^1$, and pattern plates $v$ having an outer configuration corresponding to the desired form of the partly expanded inner wall and formed with slots $v^1$ engaged by pins $o^2$ projecting from the links $o$, the links $o$ and pattern plates $v$ being capable of being retracted into the slot $t^1$. The expansible mandrel is used as follows: For inserting the same into the vessel the rod $u$ is retracted so far that the links $o$ retract the pattern plates $v$ into the slot $t^1$, whereupon the mandrel is inserted into the vessel through the neck thereof. Now the mandrel is rotated and the rod $u$ is gradually pushed inwardly thus shifting the pattern plates $v$ outwardly and gradually expanding the glass. After the glass has been sufficiently expanded the pattern plates are again retracted by means of the rod, and the whole apparatus is retracted from the vessel, whereupon the inner wall is further expanded in the manner described.

In some cases I use the expansible mandrel for expanding the glass into the final form of the inner wall of the vessel, as has been shown in Fig. 8.

After the vessel has thus been manufactured the space between the inner and outer walls is evacuated in the manner known in the art.

In Figs. 9 to 13 I have shown a modification of the method which is suitable for manufacturing plain cylindrical vessels having no neck. The first steps of the method are similar to the first steps of the methods described above. The outer wall $a^1$ of the cylindrical vessel is formed by blowing in a mould $b^1$, and it is formed with a rim $m^1$ and a cap $d^1$, as has been shown in Fig. 9. The bunting iron is removed, a spacing ball $r^1$ is brought into the vessel, a hole $e^1$ is made in the wall of the vessel, the cap is made to sink into the same, and a mass of glass $h^1$ is brought into the cup $g^1$, all as has been described above. Now the blank has the form shown in Fig. 10. The cup $g^1$ and the mass of molten glass $h^1$ are pressed into the outer wall $a^1$ by means of a rotary non-expansible mandrel $w$, by means of which the inner wall $b^1$ is completed, as has been shown in Fig. 11. In the example shown in Figs. 10 and 11 a mandrel $w$ of polygonal cross-section is used the side faces of which recede from the corners or operative parts of the mandrel. Thereby when using the mandrel passages are formed between the said side faces and the glass, through which the gases developed in the operation escape from the vessel. In Fig. 13 I have shown a star-shaped mandrel.

In the foregoing description I have described the methods which are the preferred ones as far as I am at present advised. But I wish it to be understood that I do not limit myself to the specific operations for performing the successive steps of the method. In some cases I cause the cap portion to pass into the neck portion by outer pressure or merely by gravity, instead of partly evacuating the outer vessel $a$. In a similar way the mass of glass brought into the body $a$ may be expanded by outer air pressure. Further, the cup and molten glass may be brought into the body of the vessel either in the manner described above by evacuating the vessel and using a mandrel, or by outer air pressure, or by gravity. Under certain circumstances the use of the expansible mandrel is preferred because thereby the inner wall is made uniform in thickness and speedy work is possible. Thereby the method is made economical, and the inner body can be readily expanded because it remains sufficiently soft.

I claim:

1. The herein described method of manufacturing double-walled glass vessels, which consists in manufacturing the outer wall of the vessel to be manufactured and forming the same with a cap, passing the said cap into the vessel in the form of a cup, filling so much glass into the said cup as is necessary for manufacturing the inner wall of the receptacle, and forming the cup and glass filled into the same into the inner wall of the vessel.

2. The herein described method of manufacturing double-walled glass vessels, which consists in manufacturing the outer wall of the vessel to be manufactured and forming the same with a cap, passing the said cap into the vessel in the form of a cup, filling so much glass into the said cup as is necessary for manufacturing the inner wall of the receptacle, and pressing the cup and glass contained therein by means of a mandrel into the body of the outer wall.

3. The herein described method of manufacturing double-walled glass vessels, which consists in manufacturing the outer wall of the vessel to be manufactured and forming the same with a cap, passing the said cap into the vessel in the form of a cup, filling so much glass into the said cup as is necessary for manufacturing the inner wall of the receptacle, pressing the cup and glass contained therein by means of a mandrel into the body of the outer wall, and forming the same into the inner wall.

4. The herein described method of manufacturing double-walled glass vessels, which consists in manufacturing the outer wall of the vessel to be manufactured and forming the same with a cap, passing the said cap into the vessel in the form of a cup, filling so much glass into the said cup as is necessary for manufacturing the inner wall of the receptacle, causing the cup and glass contained therein to pass into the body of the outer wall, and expanding the mass of glass within the outer wall by means of an expansible mandrel.

5. The herein described method of manufacturing double-walled glass vessels, which consists in manufacturing the outer wall of the vessel to be manufactured and forming the same with a cap, passing the said cap into the vessel in the form of a cup, filling so much glass into the said cup as is necessary for manufacturing the inner wall of the receptacle, causing the cup and glass contained therein to pass into the body of the outer wall, and expanding the mass of glass within the outer wall by means of an expansible mandrel rotatable relatively to the vessel and formed with portions receding from the working part thereof.

6. The herein described method of manufacturing double-walled glass vessels, which consists in manufacturing the outer wall of the vessel to be manufactured and forming the same with a cap, passing the said cap into the vessel in the form of a cup, filling so much glass into the said cup as is necessary for manufacturing the inner wall of the receptacle, causing the cup and glass contained therein to pass into the body of the outer wall, expanding the mass of glass within the outer wall by means of an expansible mandrel, and forming the partly expanded glass into the inner wall of the receptacle by differential fluid pressure.

7. The herein described method of manufacturing double-walled glass vessels, which consists in manufacturing the outer wall of the vessel to be manufactured and forming the same with a cap, passing the said cap into the vessel to form a cup, filling a mass of molten glass into said cup, and expanding the same into the form of the inner wall of the vessel by differential fluid pressure.

8. The herein described method of manufacturing double-walled glass vessels, which consists in manufacturing the outer wall of the vessel to be manufactured and forming the same with a cap, passing the said cap into the vessel to form a cup, filling a mass of molten glass into said cup, and expanding the same within the outer wall into the form of the inner wall by evacuation of the space included between the same and the outer wall.

9. The herein described method of manufacturing double-walled glass vessels, which consists in manufacturing the outer wall of the vessel, putting a spacing member into the same, forming the inner wall of the vessel, reheating the outer wall, and deforming the same for insuring contact between said spacing member and the outer and inner walls.

10. The herein described method of manufacturing double-walled glass vessels, which consists in manufacturing the outer wall of the vessel, putting a spacing member into the same, forming the inner wall of the vessel, reheating the outer wall, and pressing the same against said spacing member for insuring contact between said spacing member and the outer and inner walls.

11. The herein described method of manufacturing double-walled glass vessels, which consists in manufacturing the outer wall of the vessel, putting a spacing member into the same, forming the inner wall of the vessel, reheating the outer wall at the part adjacent the spacing member, and deforming the same for insuring contact between said spacing member and the outer and inner walls.

12. The herein described method of manufacturing double-walled glass vessels, which consists in manufacturing the outer wall of the vessel, putting a spacing member into the same and on the bottom thereof, forming the inner wall of the vessel, reheating the outer wall and deforming the same for insuring contact between said spacing member and the outer and inner walls.

13. The herein described method of manufacturing double-walled glass vessels, which consists in manufacturing the outer wall of the vessel to be manufactured and forming the same with a cap, passing a spacing member into the same, passing the said cap into the vessel in the form of a cup, filling so much glass into the said cup as is necessary for manufacturing the inner wall of the receptacle, forming the cup and glass filled into the same into the inner wall of the vessel, reheating the outer wall, and deforming the same for insuring contact between said spacing member and the outer and inner walls.

14. The herein described method of manufacturing double-walled glass vessels, which consists in manufacturing the outer wall of the vessel to be manufactured and forming the same with a cap, passing a spacing member into the same, passing the said cap into the vessel in the form of a cup, filling so much glass into the said cup as is necessary for manufacturing the inner wall of the receptacle, forming the cup and glass filled into the same into the inner wall of the vessel, reheating the outer wall, and pressing the same against said spacing member for insuring contact between said spacing member and the outer and inner walls.

15. The herein described method of manufacturing double-walled glass vessels, which consists in manufacturing the outer wall of the vessel to be manufactured and forming the same with a cap, passing a spacing member into the same, passing the said cap into the vessel in the form of a cup, filling so much glass into the said cup as is necessary for manufacturing the inner wall of the receptacle, forming the cup and glass filled into the same into the inner wall of the vessel, reheating the outer wall at the part adjacent the spacing member, and deforming the same for insuring contact between said spacing member and the outer and inner walls.

16. The herein described method of manufacturing double-walled glass vessels, which consists in manufacturing the outer wall of the vessel to be manufactured and forming the same with a cap, passing a spacing member into the same and on the bottom thereof, passing the said cap into the vessel in the form of a cup, filling so much glass into the said cup as is necessary for manufacturing the inner wall of the receptacle, forming the cup and glass filled into the same into the inner wall of the vessel, reheating the outer wall, and deforming the same for insuring contact between said spacing member and the outer and inner walls.

17. The herein described method of manufacturing double-walled glass vessels, which consists in manufacturing the outer wall of the vessel to be manufactured and forming the same with a cap and a doubled rim around the same, passing the said cap into the vessel in the form of a cup, filling so much glass into the said cup as is necessary for manufacturing the inner wall of the receptacle, and forming the cup and glass filled into the same into the inner wall of the vessel.

In testimony whereof I have signed at the city of Berlin this 17th day of April, A. D. 1926.

WILHELM HODECKER.